US008446311B2

(12) United States Patent
Ricci et al.

(10) Patent No.: US 8,446,311 B2
(45) Date of Patent: May 21, 2013

(54) ARRAY OF UHF RADAR BASES FOR PROTECTING SENSITIVE ZONES AGAINST INTRUSIONS

(75) Inventors: Yves Ricci, Courbevoie (FR); Christian Cavallari, Montigny le Bretonneux (FR)

(73) Assignee: Thales, Neuilly sur Seine (FR)

( * ) Notice: Subject to any disclaimer, the term of this patent is extended or adjusted under 35 U.S.C. 154(b) by 243 days.

(21) Appl. No.: 12/957,210

(22) Filed: Nov. 30, 2010

(65) Prior Publication Data
US 2011/0254724 A1    Oct. 20, 2011

(30) Foreign Application Priority Data
Dec. 1, 2009 (FR) ...................... 09 05796

(51) Int. Cl.
*G01S 13/00* (2006.01)
(52) U.S. Cl.
USPC .................. 342/28; 342/27; 342/59
(58) Field of Classification Search
USPC ............................... 342/27, 28, 59
See application file for complete search history.

(56) References Cited

U.S. PATENT DOCUMENTS

| | | | |
|---|---|---|---|
| 3,581,310 A | | 5/1971 | Buckley |
| 3,731,310 A | * | 5/1973 | Rittenbach ........................ 342/59 |
| 3,815,131 A | * | 6/1974 | Dautel et al. .................... 342/28 |
| 3,971,025 A | * | 7/1976 | Levine ........................... 342/410 |
| 4,595,924 A | | 6/1986 | Gehman |
| 5,179,384 A | * | 1/1993 | De Haan ......................... 342/37 |
| 5,557,278 A | * | 9/1996 | Piccirillo et al. ................ 342/29 |
| 5,920,279 A | * | 7/1999 | Andersson ...................... 342/59 |
| 5,955,984 A | * | 9/1999 | Schober et al. ............... 342/159 |
| 6,359,583 B1 | * | 3/2002 | Shamee ........................ 342/33 |
| 6,822,604 B2 | * | 11/2004 | Schantz et al. ................. 342/28 |

(Continued)

FOREIGN PATENT DOCUMENTS
FR         2 910 161 A1    6/2008

OTHER PUBLICATIONS

Odile Adrian, et al., "A Combination of NLOS Radar Technology and LOS Optical Technology for Defence & Security", Institution of Engineering Technology "IET" Conference Publications, Oct. 15, 2007, pp. 40-45, XP002586575.

*Primary Examiner* — Jack W Keith
*Assistant Examiner* — Peter Bythrow
(74) *Attorney, Agent, or Firm* — Baker Hostetler LLP (57) ABSTRACT

A system for protecting sensitive zones includes detection bases disposed in such a way that each base performs the monitoring of a part of the limit of the protected zone. To each base n is allocated a frequency channel of width B' centered on a frequency $F_n$. Each base comprises a plurality of UHF radars emitting pulses of spectral width B, with a high repetition frequency Fr. Each radar processes a fraction $b_0$ of the global Doppler band $b_1$ concerned. The emission frequencies of the various radars constituting one and the same base are defined in such a way that the gap between the emission frequency Fi of a radar of the base and the frequency $F_n$ is less than the repetition frequency Fr and that the gap between the emission frequencies Fi and Fj of two radars of one and the same base is greater than $(b_1+b_0)/2$. The channel allocated to a base n as well as the emission frequencies allocated to the radars of this base are defined in such a way that, having regard to the position of the base, none of the radars constituting the base concerned is liable to be disturbed from a radioelectric point of view by the radars of the other bases.

8 Claims, 5 Drawing Sheets

U.S. PATENT DOCUMENTS

| | | |
|---|---|---|
| 6,977,610 B2 * | 12/2005 | Brookner et al. ............... 342/59 |
| 7,151,483 B2 * | 12/2006 | Dizaji et al. .................. 342/201 |
| 7,256,727 B2 * | 8/2007 | Fullerton et al. ................ 342/28 |
| 7,541,968 B2 * | 6/2009 | Hall et al. ....................... 342/28 |
| 7,868,812 B2 * | 1/2011 | Huthoefer et al. ............. 342/28 |
| 8,237,606 B2 * | 8/2012 | Molin et al. .................... 342/28 |
| 2002/0130807 A1 * | 9/2002 | Hall et al. ....................... 342/28 |
| 2004/0021599 A1 * | 2/2004 | Hall et al. ....................... 342/28 |
| 2005/0242985 A1 * | 11/2005 | Ponsford et al. ................ 342/59 |
| 2008/0291077 A1 * | 11/2008 | Chang ............................ 342/59 |
| 2009/0201190 A1 * | 8/2009 | Huthoefer et al. ............. 342/27 |
| 2010/0201561 A1 * | 8/2010 | Dhondt et al. .................. 342/27 |
| 2011/0254724 A1 * | 10/2011 | Ricci et al. ..................... 342/28 |

\* cited by examiner

ARRAY OF UHF RADAR BASES FOR PROTECTING SENSITIVE ZONES AGAINST INTRUSIONS

CROSS-REFERENCE TO RELATED APPLICATION

This application claims priority to foreign French patent application No. FR 0905796, filed on Dec. 1, 2009, the disclosure of which is incorporated by reference in its entirety.

FIELD OF THE INVENTION

The present invention relates to the general field of the protection of sensitive zones by means of radar detection systems. It relates more particularly to the protection of sensitive zones against the intrusion of individuals moving at low speed and profiting from the presence of masks to conceal themselves. Here, the term mask is understood to imply elements, buildings or elements of vegetation, which impair the performance of the detection systems implemented and thus render it difficult, or indeed impossible, to detect intruders (individuals or vehicles) in the zones in which they are situated.

BACKGROUND

At the present time, the availability of means for ensuring the protection of a sensitive zone against possible intrusions constitutes an issue that is both significant and poorly mastered. Indeed, depending on the size of the zone to be protected, the nature of the terrain constituting this zone, the permanent or temporary character of the protection deployed as well as the degree of selectivity sought as regards objects that ought to be considered intruders, the solution to be implemented can take substantially different forms.

Based on the type of protection desired and criteria defining this protection, it is therefore necessary to determine the most appropriate type of protection systems from among those available on the market. However, at the present time, the proposed solutions are very few and do not generally make it possible to simultaneously satisfy all the criteria defining the desired type of zone protection.

A known protection scheme consists in installing a perimeter monitoring system comprising sensors disposed more or less regularly, on the ground or at a given height, along a line delimiting the entrance or the outline of the sensitive zone, these sensors having the main role of detecting the crossing of this line by one or more intruders. In a known manner, it is for example possible to use, depending on the case, simple seismic sensors or in a more sophisticated manner barriers of infrared sensors.

The detection elements used for this type of protection are generally defined by taking account of the temporary or permanent character of the barrier deployed. They are also defined as a function of logistical criteria such as, for example, the ease of transporting these elements on a man's back or on a lightweight vehicle or else their swiftness of implementation to form the sought-after protection barrier.

Systems such as those mentioned have an advantageously simple manner of operation. Moreover they allow effective detection of an intruder whatever the environment in which they are disposed. They can thus be installed in a wooded zone. On the other hand, they exhibit a certain number of drawbacks:

the protection that they offer is very generally limited to the signalling of an intrusion, at the actual instant at which the barrier thus constituted is crossed. In the most favourable case this signalling is supplemented with a more or less precise item of information, relating to the spot where the barrier has been crossed. They do not therefore make it possible to implement an early signalling procedure, making it possible to be informed of the approaching of the zone to be protected by possible intruders.

the item of information provided is limited to the noting of the crossing of the detection barrier by an intruder. After detecting an intrusion, these systems do not generally provide any further information relating to the progress of the intruder in the protected zone so that in the absence of a very fast reaction, the search for the intruder or intruders entails a complete exploration of the protected zone.

Moreover, in addition to the drawbacks cited above, systems using optical or infrared detectors generally exhibit the drawback of becoming inoperative when the atmosphere becomes too humid.

Another known protection scheme consists in installing a monitoring system based on the implementation of a short-range surveillance radar operating for example in the S band or in the X band. The use of such a system exhibits numerous advantages:

It makes it possible to carry out at one and the same time the detection of the crossing of the line defining the entrance to the zone to be protected and the monitoring of the space constituting this zone. Under certain utilization conditions, the use of a radar system also makes it possible to carry out detection of approach to the protected zone.

It makes it possible to produce a detection system which is very intensitive to climatic conditions.

It also makes it possible, in so far as the detection means implemented are radar means, to ascertain the speed of progress of a detected intruder. It is thus advantageously possible to determine the category, animal, pedestrian or vehicle for example.

Finally it makes it possible to carry out the detection of objects moving on the ground at a relatively slow pace, and also the detection of objects, generally faster, flying at low altitude.

Hence, it is possible to determine at one and the same time the nature of the intruder, the position of the intrusion point, as well as the movement of the intruder inside the sensitive zone.

Moreover, the use of a barrier consisting of such a radar also advantageously makes it possible to simplify the conditions of utilization of the system for monitoring the zone, by mobilizing only a single operator.

On the other hand, the deployment of such radar equipment exhibits drawbacks too:

It is generally expensive, the radar equipment used generally being sophisticated;

It is limited in its conditions of use, in so far as the use of a short-range monitoring radar operating in the S band or in the X band is inoperative as soon as the space covered exhibits elements that could obstruct the direct propagation of the waves emitted, clumps of trees for example.

Thus, if the zone to be protected comprises wooded areas, the coverage of these areas is not ensured, so that an intruder can exploit this absence of coverage so as to penetrate into the zone and progress therein without being immediately detected.

SUMMARY OF THE INVENTION

The invention provides a solution making it possible to produce a protection barrier for a sensitive zone of any nature, that may in particular comprise significant elements of vegetation. Another aim of the invention is to propose a solution also making it possible to anticipate the possible intrusion of a moving object approaching the protected zone and to follow, over a certain distance at least, the progress of an intruder detected in the protected zone. Another aim of the invention is furthermore to propose a solution also making it possible to protect a very extensive zone for optimal cost of implementation.

For this purpose the subject of the invention is a radar detection device comprising a base n to which is allocated a frequency channel with a nominal frequency Fn and a frequency band of width B', on which are located pulsed Doppler UHF radars, of high repetition frequency Fr, each radar i operating in a frequency band B, centred on an emission frequency Fi. According to the invention, each radar i utilizing a Doppler spectral band $b_0$ around its emission frequency Fi, the number N of radars that the base can comprise and the emission frequency Fi of each radar i are defined in such a way that:

the gap $(F_1-F_n)$ is smaller in absolute value than the difference $(Fr-b_0)/2$ and is not a sub-multiple of $Fr/2$;

a global Doppler spectral band $b_1$ corresponding to a maximum span of speeds being defined, the gap between the emission frequencies Fi and Fj of any two radars i and j of the base is greater than $(b_1+b_0)/2$.

According to the invention, for a given global Doppler spectral band b1, the number N of radars that a base can comprise is dependent on the ratio $Fr/b_1$.

According to a particular embodiment, the radars are arranged on the base in such a way as to cover a continuous aperture zone extending over substantially 180°.

In a variant of the previous embodiment, the angular sectors covered by the various radars exhibit overlap zones.

According to a particular embodiment, the radars are arranged on the detection base so as to cover distinct sectors surrounding this base.

In a variant of the previous embodiment, the radars are arranged in such a way that, having regard to the angular sector that can be covered by a radar, a continuous aperture zone extending over substantially 360° around the base is covered.

The subject of the invention is also a radar system for detecting intrusions into a protected zone (II) delimited by a limit, the crossing of this limit being considered to be an intrusion into the protected zone. The system comprises a plurality of detection bases according to the invention, arranged in such a way as to cover in a continuous manner the limit of the protected zone over the whole of its length. Each base n operates in a spectral band B' centred on a frequency $F_n$. The frequency $F_n$ allocated to a base n is defined in such a way that, having regard to the position occupied by a base, none of the radars constituting the base concerned is liable to be impeded from a radioelectric point of view by the radars of the other bases.

According to a particular mode of implementation of the system according to the invention, for which each base comprises M colocated UHF radars, whose Doppler spectral band is such that, having regard to the repetition frequency Fr, a number N, which is a multiple of M, of radars can operate in one and the same frequency band. The system according to the invention allocates one and the same frequency F to N/M detection bases. The detection bases operating in one and the same spectral band are arranged in such a way that the emission carried out by a base does not impair the detection capabilities of the other bases occupying the same spectral band B'.

BRIEF DESCRIPTION OF THE DRAWINGS

The characteristics and advantages of the invention will be better appreciated by virtue of the description which follows, which description sets forth the invention through a particular embodiment taken as nonlimiting example and which is supported by the appended figures, which figures represent.

Figure 1:
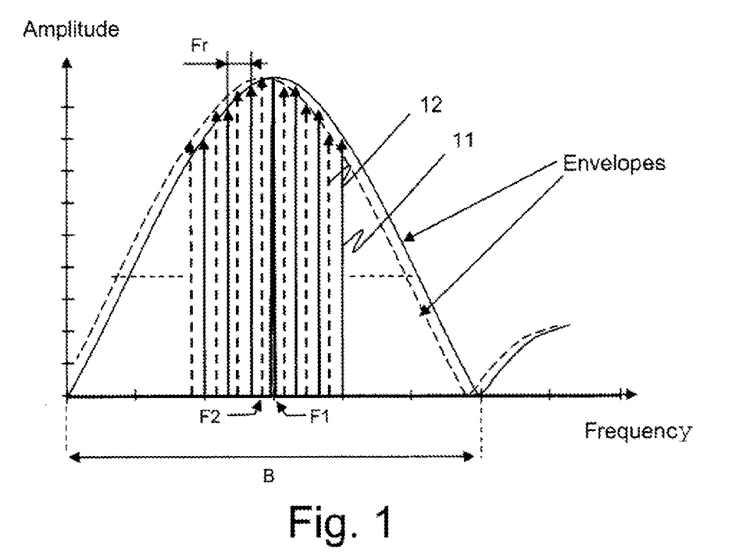
FIGS. 1 and 2, illustrations relating to the operating principle of the system according to the invention.
Figure 2:
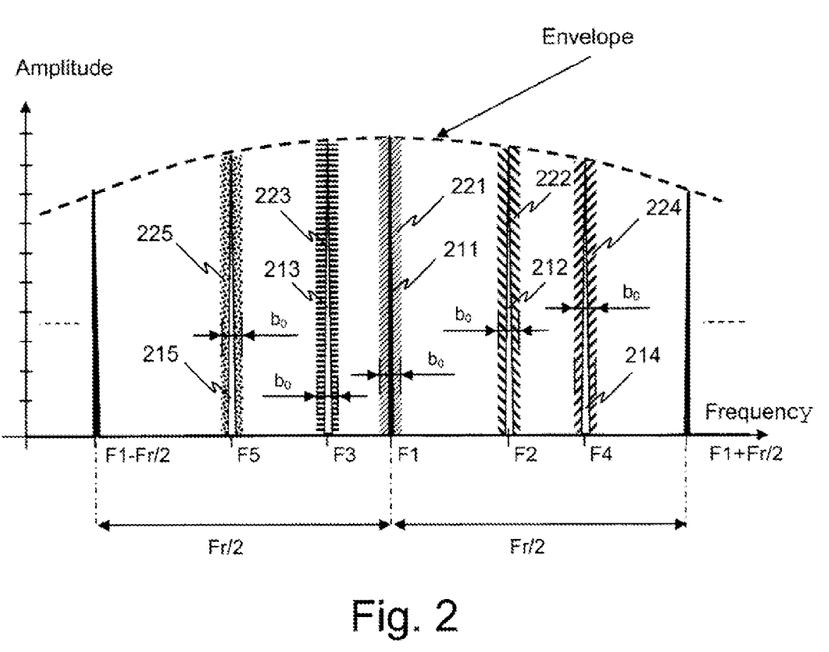

FIGS. 1 and 2 make it possible to describe the principles on which the operation of the system according to the invention is based.

DETAILED DESCRIPTION

The main object of the radar detection system according to the invention is, as stated previously, to detect intruders, individuals or terrestrial vehicles attempting to penetrate into a protected zone. Here, the search for this precise objective entails the taking of certain advantageous features into account in a combined manner.

Firstly, the objective that it is the system's object to fulfil should be considered. Indeed, the main function of the detection system considered here is to detect the intrusion of objects, vehicles or individuals, moving on the ground and therefore making relatively slow movements. The intruders involved therefore have the characteristic of travelling within a relatively low span of speeds, speeds of typically less than 10 m/s. Therefore, the detection of flying craft, drones or aircraft, is excluded here, this being presumed to be carried out by conventional aerial means of detection.

The consequence of such a finding is that the Doppler spectrum characterizing these objects is a narrow spectrum relative to the spectral band corresponding to the total span of speeds of the real objects that may travel within the monitored space, a span typically extending from 0 m/s to 300 m/s. The frequency band $b_0$, corresponding to this narrow Doppler spectrum, is here called the useful Doppler band. It represents a fraction of the global Doppler band $b_1$ which represents the entirety of the relevant span of speeds, typically a span extending from 0 m/s to 330 m/s.

Secondly, it should be considered that the system forming the detection barrier is by nature liable to be installed in zones with more or less dense vegetation, which are by nature ill-accessible to monitoring by means of radars operating conventionally in the L, S or X band. In such a context, the use of radars operating in the UHF band would therefore seem appropriate.

Thirdly, it should be noted that the object of such a barrier is not to carry out long-distance detection. Accordingly, the instrumented distance $D_i$ being, in this case, small on principle, typically a few km, it is possible, in order to carry out short-range detection, to implement pulsed radars with waveforms involving a high repetition frequency Fr ($Fr=C/2D_i$) so that, as illustrated by FIG. 1, the spectrum of the signal received appears as a spectrum of lines spaced Fr apart.

The invention advantageously exploits these various findings to define a set of technical characteristics which in combination characterizes the invention.

Thus, the invention consists firstly of a detection base comprising a plurality of colocated UHF radars. These UHF radars are moreover configured to carry out the Doppler analysis of the signals received on a small spectral band $b_0$, or useful Doppler band. Furthermore the radars used are pulsed radars of high repetition frequency Fr, compatible with the desired range. According to the invention, the radars constituting one and the same detection base preferably emit pulses of identical shapes whose spectrum occupies an instantaneous frequency band B of a few megahertz, 5 or 6 MHz typically.

The useful Doppler band $b_0$, which corresponds to the previously described span of speeds, extends, having regard to the wavelengths utilized (UHF band), over a few tens of hertz. Thus, for example, if the frequency used is a UHF frequency of the order of 450 MHz (i.e. the wavelength A is of the order of 0.7 m), the useful Doppler band $b_0$ analysed for targets moving at a speed varying from 0 m/s to 6 m/s extends from 0 Hz to some twenty or so Hz.

The spectral representation of FIG. 1 illustrates how the high character of the repetition frequency Fr, associated with the narrow character of the useful Doppler band $b_0$, may be advantageously exploited to utilize several radars located in one and the same spot. The simultaneous consideration of these characteristics has indeed led the applicant to envisage the implementation of colocated radars operating on one and the same global UHF frequency band, one and the same channel. According to the invention, these radars are configured to operate with identical instantaneous bands B, centred on emission frequencies Fi that are close together, and to utilize a narrow Doppler spectral band $b_0$.

FIG. 1 illustrates this principle through a configuration with two colocated radars whose nominal working frequencies F1 and F2 are shifted appropriately in such a way that having regard to the repetition frequency Fr which determines their spacing, the lines 11 of the spectrum emitted by the first radar are interleaved with those 12 of the spectrum emitted by the second radar. In this example the instantaneous bands B of the two radars (envelopes) are centred on two frequencies F1 and F2 shifted by a value smaller than Fr/2.

By extension, this arrangement may be reproduced for configurations comprising a more sizeable number of colocated radars, as illustrated by the magnified spectral representation of FIG. 2.

Thus, provided that the Doppler band concerned is much smaller than the repetition frequency Fr of the emitted pulses, it is advantageously possible to implement a sizeable number of radars operating in the vicinity of one another, or indeed of colocated radars, and emitting pulses at very close frequencies Fi, contained in a frequency band equal to Fr. The width B' of the global frequency band, of the channel allocated to this group of radars is then defined so as to cover all the neighbouring bands B of the pulses emitted by these radars.

FIG. 2 illustrates this principle through a configuration with five colocated radars emitting pulses of instantaneous spectrum B with a repetition frequency Fr. The five emission frequencies, $F_1$ to $F_5$, are here apportioned in a passband of width Fr centred on a nominal frequency, the emission frequency $F_1$ of one of the radars used for example. Here, each of these radars i utilizes a useful Doppler band $b_0$, 211 to 215, centred on its emission frequency Fi, 221 to 225.

Such a configuration thus makes it possible, advantageously, to constitute a detection base comprising a plurality of colocated UHF radars, using, without impeding one another, one and the same instantaneous frequency band B, the number of radars simply being dependent on the ratio between the Doppler band considered which is determined by the size of the span of speeds corresponding to the mobile objects or beings that may be detected, and the repetition frequency Fr used.

It should be noted that precautions have to be taken to choose the emission frequencies used for the radars installed at one and the same spot. Indeed, to avoid any spectral overlap effect, the nominal frequencies of the various radars must be chosen in such a way that the frequency gap between two radars is not a sub-multiple of the repetition frequency Fr.

Figure 3:
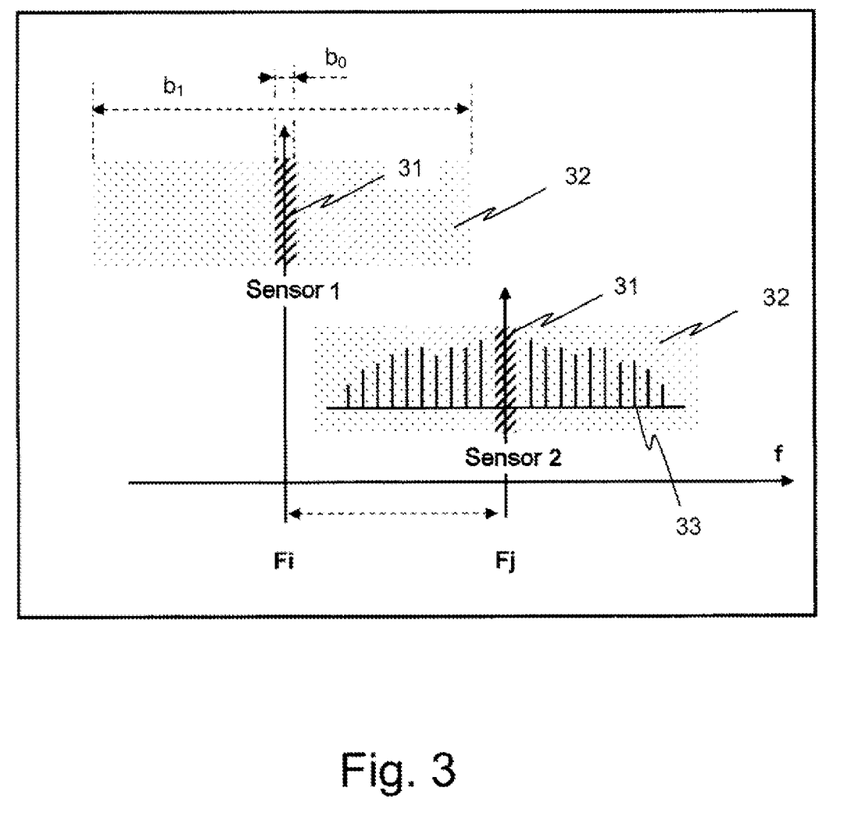
FIG. 3, an illustration of the principle for managing the emission frequencies of the UHF radars colocated on one and the same detection base.

It should also be noted that, as illustrated by FIG. 3, the nominal frequencies Fi allocated to each of the UHF radars constituting a detection base according to the invention are defined by considering the global Doppler spectral band $b_1$, 32, which represents the entirety of the relevant span of speeds, typically a span extending from 0 m/s to 330 m/s. In practice, the gap between the nominal frequencies Fi and Fj of any two radars of one and the same detection base is defined in such a way that the useful Doppler band $b_0$, 31, of a radar i is not included in the global Doppler band $b_1$, 32, of the other radar j.

Accordingly, the maximum number of radars that may be located on one and the same detection base is here dependent on the global Doppler spectral band $b_1$, the useful Doppler band $b_0$ and the repetition frequency Fr of the emitted pulses.

Hence, a signal reflected by an object and subsequent to the signal emitted by a given radar of a detection base will not affect the useful Doppler bands 31 of the other radars of the base, even if the spectrum 33 of the signal concerned extends over the entire global Doppler band 32. Only the radar that emitted the pulse from which the signal originates can thus be affected by this reflected signal.

Figure 4:
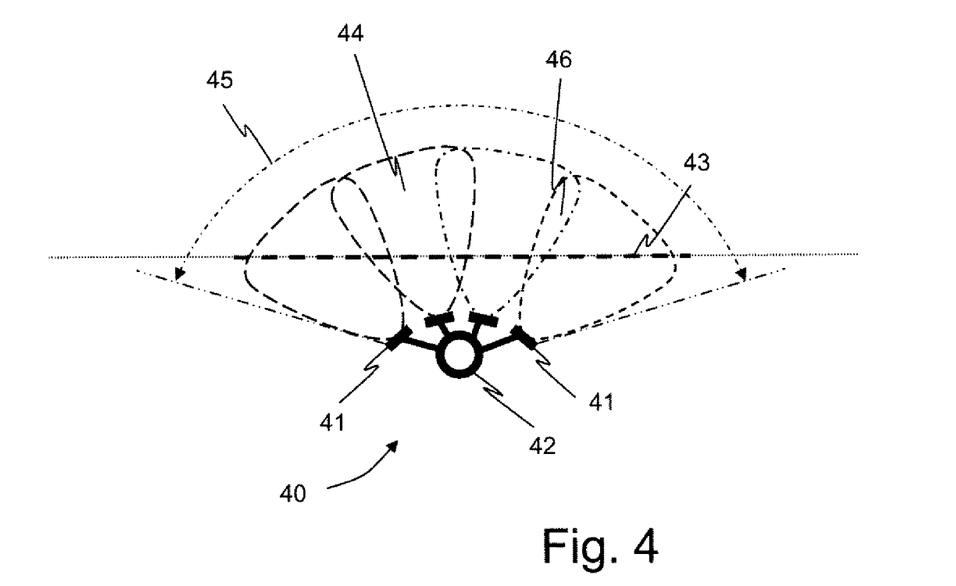
FIGS. 4 and 5, schematic representations of possible arrangements of the various colocated radars forming a detection base according to the invention.
Figure 5:
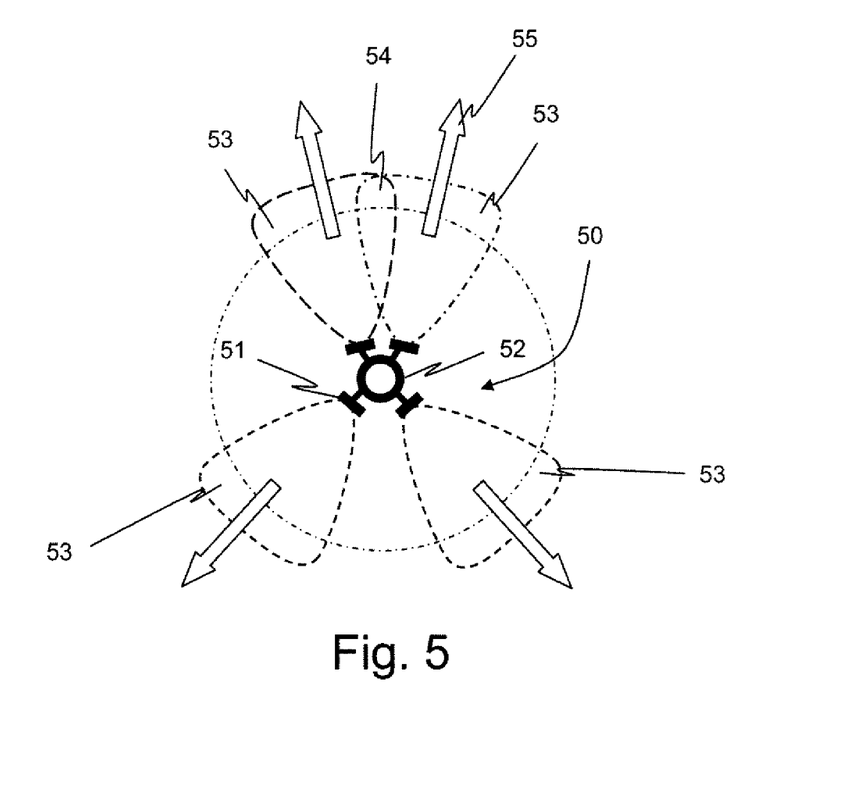

FIGS. 4 and 5 present two examples of detection base implementing the "colocated UHF multi-radars" configuration according to the invention.

FIG. 4 represents in a schematic manner a first configuration 40 of base which comprises a set of UHF radars 41 mounted on a mast 42 and arranged so as to jointly ensure the detection of possible intruders seeking to pass through a portion of a given limit demarcated by the dashed line 43. In this first configuration each radar of the base is arranged so as to cover a given angular sector 44, the set of angular sectors covered corresponding to a global sector ensuring a coverage 45 over substantially 180°. Additionally, having regard to the shapes of the radiation patterns of the various radars forming the base, these patterns are arranged in such a way that their angular sectors 44 exhibit a partial overlap 46 so as to ensure detection over a given distance around the limit 43 concerned.

It should be noted here that, having regard to the configuration of the emission frequencies of the various radars, which configuration follows the principle previously described and illustrated by FIG. 2, the presence of an overlap 46 of the angular sectors 44 of two radars 41 advantageously causes no problem of radio electric interference, through the formation of bistatic echoes, between the two radars concerned, the useful Doppler bands utilized by the two radars being in principle disjoint, as illustrated by FIG. 3.

It should be noted that as the set of radars 41 forming one and the same detection base uses one and the same instantaneous band B, the base according to the invention comprises means making it possible to temporally synchronize the instants of emission.

FIG. 5 represents in a schematic manner a second configuration 50 of base which comprises a plurality of UHF radars 51 mounted on a mast 52, the number and the arrangement of radars being determined so as to ensure the coverage of various angular sectors, demarcated by the arrows 55, around the base concerned.

According to the application concerned, the radars may be arranged so as to cover over 360° the space surrounding the detection base or to cover only certain angular sectors. Moreover, just as in the example of FIG. 4 the radars forming the base may be, with no risk of formation of spurious echoes for one or the other of the radars, arranged in such a way that the angular sectors 53 of certain radars 51 exhibit overlap zones 54. Advantageously, on account of the configuration of the nominal frequencies of the radars forming the base, the operation of a given radar is not impaired by the signals reflected subsequent to the emissions of the other radars, either by the main lobe of its antenna or by the sidelobes or by the rear lobes.

It should be noted that, as in the previous case, the set of radars 51 forming one and the same detection base uses one and the same instantaneous band B. The base according to the invention therefore comprises means making it possible to temporally synchronize the instants of emission.

Thus, according to the invention, the association on one and the same site of a radar set combining the spectral characteristics described in the above text advantageously makes it possible to produce a detection base comprising a plurality of UHF radars capable of operating simultaneously in an advantageously limited spectral band B', a channel. This spectral band B' covers the spectra B of the pulses emitted by the radars constituting the base, which spectra are advantageously interleaved.

Furthermore, although implementing fixed-antenna radars whose angular aperture, for reasons of angular precision, is generally relatively small, this detection base can advantageously exhibit a wide angular aperture while making it possible to obtain a Doppler resolution compatible with the speeds of movement of the targets that it is sought to detect.

Detection bases such as that described above can advantageously be used to produce an intrusion detection system making it possible to protect a vast zone. Accordingly, it is for example possible to define a perimeter or more generally a line defining the limit between an external zone I and an internal zone II corresponding to the zone to be protected, the crossing of which limit characterizes an intrusion into the zone concerned. Accordingly, the protection of the said zone against intrusions can, according to the invention, be carried out by arranging in an appropriate manner over the limit thus defined a plurality of detection bases according to the invention. The detection bases are disposed in such a way that the whole of the limit is monitored. Accordingly they exhibit, if necessary, a certain overlap. They are furthermore configured as is described hereinafter in the document.

Figure 6:
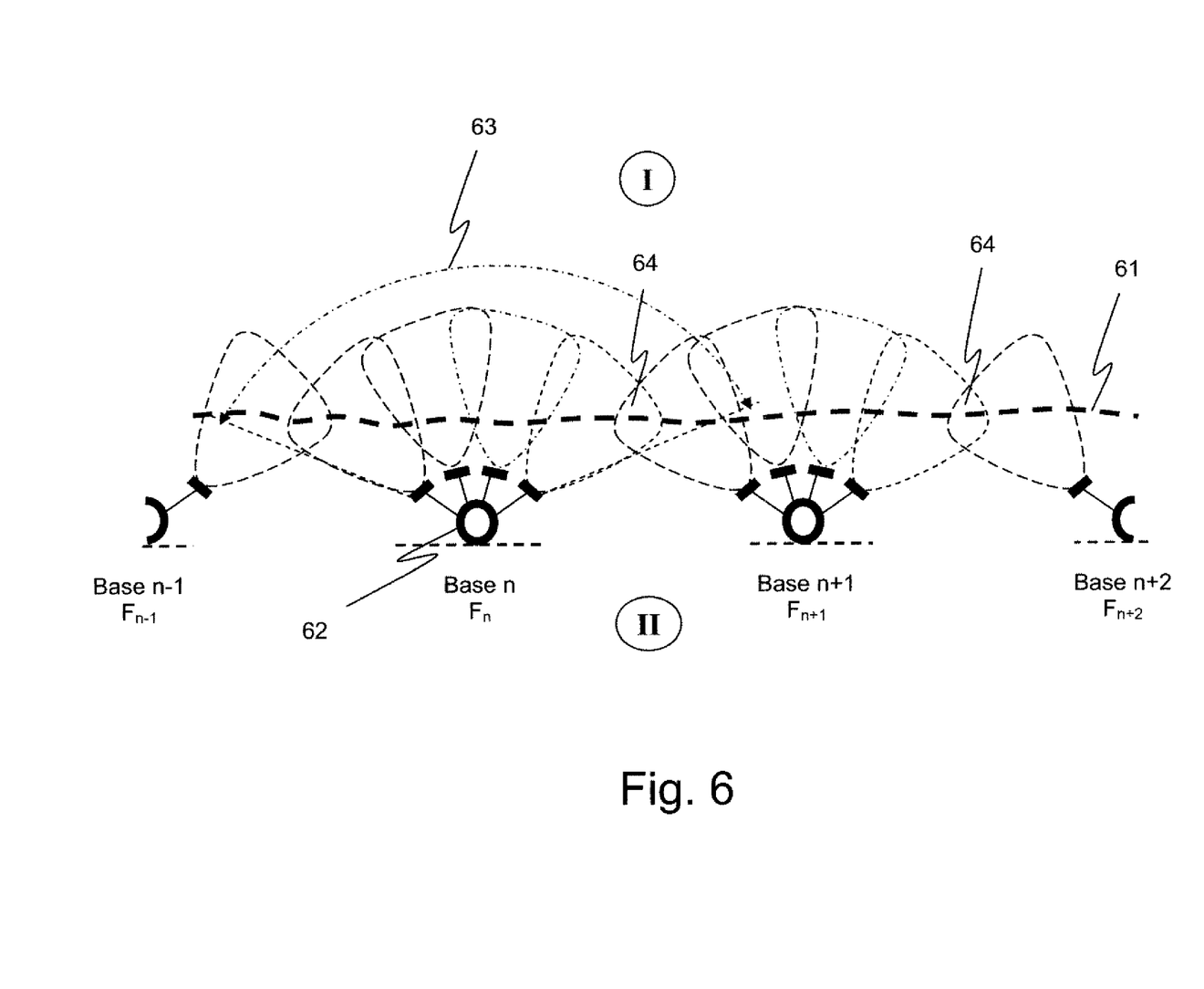
FIG. 6, a schematic illustration of the arrangement of the various bases in a detection system using detection bases according to the invention.

FIG. 6 illustrates such an arrangement according to the invention. In this illustration the monitored limit is represented by the dashed line 61, while the various detection bases 62 are represented by the bases n and n+1 represented in their entirety and by the bases n−1 and n+2 which are represented partially. As illustrated by FIG. 6, the juxtaposition of detection bases, spaced apart by a distance d, preferably constant, makes it possible to produce a detection system constituting an electromagnetic detection barrier capable of covering the whole of the limit defining the zone II to be protected. Such a system also makes it possible to follow the evolution of an intruder in the zone II after crossing the limit 61, at least over a certain penetration distance, or else to detect, in an early manner, elements situated in the zone I shy of the zone II to be protected and moving towards the latter.

The intrusion detection system according to the invention thus consists of a plurality of detection bases 62 such as that described in the above description. With each detection base n is associated a working frequency $F_n$, as well as a frequency band, a channel, of width B', centred on this frequency. According to the invention the width B' of the channel is preferably identical for all the bases 62, the various channels being for their part separated by a frequency gap.

According to the invention, the working frequency $F_n$ and the channel width B' allocated to each base is for its part determined by taking into account the distance d separating two bases which itself depends on the angular sector covered by each base and the detection range which depends on the power emitted by each base.

The nominal frequency of each base is determined as a function of the frequencies allocated to the other bases situated a sufficiently small distance from the base considered so that the latter's detection capabilities are not, having regard to the width B' of the channel allocated to each base, impaired either by direct radio electric emissions carried out by other bases operating in neighbouring channels, and inducing a desensitization of the base considered, or by the spurious echo reception (bistatic echoes) subsequent to the emissions carried out by other bases operating in the same channel, inducing spurious detections.

The determination of the width B' of the channel allocated to each base and of the working frequencies $F_n$ of the various detection bases makes it possible to determine the total frequency band required in order to operate the detection system. Advantageously the use of detection bases, such as described above, according to the invention, makes it possible to significantly limit the global frequency band required by allowing the allocation of one and the same channel to several detection bases. The exemplary application which follows makes it possible to highlight this advantageous characteristic.

Figure 7:
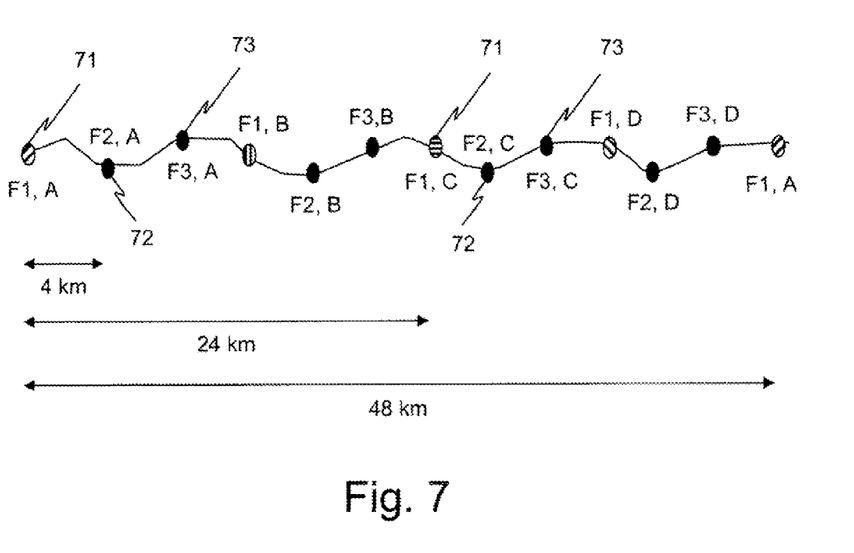
FIGS. 7 and 8, schematic illustrations relating to an exemplary implementation of a detection system according to the invention.
Figure 8:
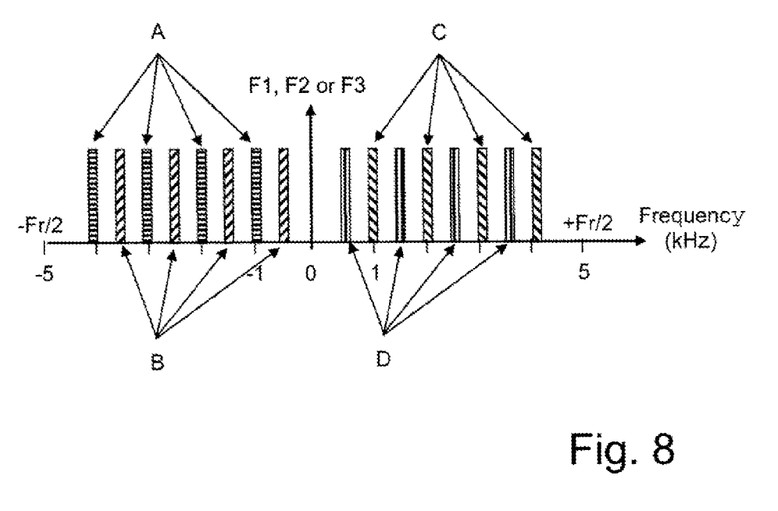

In this example, illustrated by FIGS. 7 and 8, it is proposed to produce a detection system comprising a plurality of detection bases 71, 72 or 73 spaced apart by a distance d equal to 4 km. Here, each detection base comprises 4 colocated radars configured and arranged in such a way that the total angular aperture of the detection base corresponds substantially to 180°.

In this example, each of the radars emits a pulse exhibiting a spectrum B whose main lobe has a width of 5 MHz, so that each detection base n is configured to operate at a frequency $F_n$ in a frequency band, a channel, of width B' compatible with the emitted pulse. The working frequency fi of each of the radars forming one and the same detection base is moreover defined with respect to the frequency $F_n$ in the manner illustrated by FIG. 3. The repetition frequency Fr, common for all the bases, is here equal to 10 kHz, while the global Doppler band $b_1$, 32, is equal to 850 Hz and the useful Doppler band $b_0$, 31, is equal to 20 Hz.

Starting from these various values, it is noted, as illustrated by FIG. 8, that it is possible in one and the same frequency band of width Fr, centred on a single working frequency Fi, the frequency F1 for example, to distinguish four interleaved groups A, B, C and D of narrow spectral bands equal to 20 Hz, the spectral bands forming one and the same group being spaced apart by a gap greater than $b_1$, equal for example to 1 kHz. Accordingly it is noted that one and the same working frequency $F_i$ may be used to produce four detection bases (A, B, C and D).

It is also noted that the degree of immunity that it is sought to obtain for a given base, in relation to the emissions of the bases operating on the same nominal frequency $F_n$, in the same channel, determines the minimum number of different frequencies Fn to be used, here the channels being separated from one another by a frequency gap $\Delta F$ making it possible to achieve this immunity.

Thus, starting from these data, a detection system may be constructed, as illustrated by FIG. 8, by alternating detection bases 71, 72 or 73 operating alternately on only three working frequencies $F_1$, $F_2$ and $F_3$, the detection bases operating on one and the same working frequency $F_1$, $F_2$ or $F_3$, that is to say in the same channel of width B', being associated alternately with the various spectral band groups associated with the radars constituting a base.

Accordingly, if as illustrated by FIG. 8, the distance d separating two successive bases is equal to 4 km, said distance making it possible to ensure good coverage, the distance separating two bases operating on the same nominal frequency $F_n$, that is to say in the same channel, and which are associated with the same group of Doppler spectral bands (A, B, C or D), is equal to 4×3×d, i.e. 48 km.

Advantageously, on account of the gap $\Delta F$ separating the nominal frequencies $F_n$ of two neighbouring bases, 20 MHz here, and of the width of the instantaneous band B which corresponds to the width of the emitted pulses, the phase noise of the spectrum of the pulses emitted by a base, a base of nominal frequency F1 for example, becomes negligible when it is received by the neighbouring base, a base of nominal frequency F2 for example, which here is 4 km away.

Hence, having regard to the range of a measurement base, the width $\Delta F$ of the frequency band allocated to each base and the instantaneous band B, it is advantageously possible, by alternating three different nominal frequencies (i.e. three different channels) and four Doppler spectral band groups (A, B, C and D), to produce a system according to the invention using only a limited global frequency band, 60 MHz here, whatever the length of the limit of the zone to be protected and therefore the number of detection bases constituting the system.

The invention claimed is:

1. A radar detection device comprising:
 a base n to which is allocated a nominal frequency Fn and a frequency band of width B', on which are located pulsed Doppler UHF radars, of high repetition frequency Fr, each radar operating in a frequency band B, centred on an emission frequency Fi;
 wherein, each radar i utilizing a Doppler spectral band $b_0$ around its emission frequency Fi, the number N of radars that the base can comprise and the emission frequency Fi of each radar i are defined in such a way that the gap $(F_i - F_n)$ is smaller in absolute value than the difference $(Fr - b_0)/2$ and is not a sub-multiple of Fr/2;
 a global Doppler spectral band $b_1$ corresponding to a maximum span of speeds being defined, the gap between the emission frequencies Fi and Fj of any two radars i and j of the base is greater than $(b_1 + b_0)/2$.

2. The device according to claim 1, wherein, for a given global Doppler spectral band b1, the number N of radars that a base can comprise is dependent on the ratio $Fr/b_1$.

3. The device according to claim 1, wherein the radars are arranged on the base in such a way as to cover a continuous aperture zone extending over substantially 180°.

4. The device according to claim 3, wherein angular sectors covered by the various radars exhibit overlap zones.

5. The device according to claim 1, wherein the radars are arranged so as to cover distinct sectors surrounding a detection base.

6. The device according to claim 5, wherein the radars are arranged in such a way that, having regard to an angular sector that can be covered by a radar, a continuous aperture zone extending over substantially 360° around the base is covered.

7. A radar system for detecting intrusions into a protected zone delimited by a line, the crossing of the line being considered to be an intrusion into the protected zone, comprising a plurality of detection bases according to claim 1, arranged in such a way as to cover in a continuous manner the limit of the protected zone over the whole of its length; each base n operating in a spectral band B' centred on a frequency $F_n$; the frequency $F_n$ allocated to a base n being defined in such a way that, having regard to the position of the base, none of the radars constituting the base concerned is liable to be impeded from a radioelectric point of view by the radars of the other bases.

8. The radar system according to claim 7, wherein, each base comprising M colocated UHF radars whose Doppler spectral band is such that, having regard to the repetition frequency Fr, a number N, which is a multiple of M, of radars can operate in one and the same frequency band, the system allocates one and the same frequency F to N/M detection bases, the detection bases operating in one and the same spectral band being arranged in such a way that the emission carried out by a base does not impair the detection capabilities of the other bases occupying the same spectral band B'.

* * * * *